United States Patent [19]

Schrauwen et al.

[11] Patent Number: 5,300,787
[45] Date of Patent: Apr. 5, 1994

[54] METHOD FOR SETTING A SENSOR WHICH DETECTS THE EDGE OF A MOVING WEB OF MATERIAL IN A CONTACT-FREE MANNER

[75] Inventors: Hans J. Schrauwen, Hiddenhausen; Theodor Nacke, Leopoldshöhe; Jürgen Bettführ, Vlotho, all of Fed. Rep. of Germany

[73] Assignee: BST Servo-Technik GmbH, Bielefeld, Fed. Rep. of Germany

[21] Appl. No.: 15,828

[22] Filed: Feb. 10, 1993

[30] Foreign Application Priority Data

Feb. 11, 1992 [DE] Fed. Rep. of Germany ....... 4203947

[51] Int. Cl.5 ............................................. G01N 21/86
[52] U.S. Cl. ....................................... 250/548; 250/557
[58] Field of Search ................... 250/208.2, 548, 557, 250/560, 561, 571; 356/429, 399, 400

[56] References Cited

U.S. PATENT DOCUMENTS

| | | | |
|---|---|---|---|
| 3,495,089 | 2/1970 | Brown | 356/429 |
| 3,625,048 | 12/1971 | Roitel | 250/560 |
| 3,655,989 | 4/1972 | Robinson | 250/560 |
| 3,746,451 | 7/1973 | Croissant et al. | 250/560 |
| 4,110,627 | 8/1978 | Isherwood | 250/548 |
| 4,146,797 | 3/1979 | Nakagawa | 250/548 |
| 4,991,761 | 2/1991 | Gnuechtel et al. | 250/260 |
| 5,119,981 | 6/1992 | Gnuechtel et al. | 226/15 |

*Primary Examiner*—David C. Nelms
*Assistant Examiner*—Stephone B. Allen
*Attorney, Agent, or Firm*—Burns, Doane, Swecker & Mathis

[57] ABSTRACT

In a web movement control device with a sensor which detects the edge of a moving web of material in a contact-free manner and can be adjusted by a sensor adjustment device, to compensate for a change of material to be controlled and/or a soiling of sensors, the sensor adjustment device is driven by an electronic signal processing device to adjust movement transversely with respect to the edge of the web. The signal processing device monitors the sensor signal changes which occur and derives a bright value or a dark value from the absence of a signal change during the movement adjustment stores the value. An intermediate value is calculated from the stored value as a control value for web movement control and stored. Under given operating conditions, this program cycle is repeated. Thereafter, the intermediate value determined in this process is compared with the originally detected value and, if a difference results, a correction factor is calculated by wherein the last intermediate value detected is corrected to match the originally detected control value.

15 Claims, 3 Drawing Sheets

METHOD FOR SETTING A SENSOR WHICH DETECTS THE EDGE OF A MOVING WEB OF MATERIAL IN A CONTACT-FREE MANNER

FIELD OF THE INVENTION

The invention relates to a method for setting a sensor, which detects the edge of a moving web of material in a contact-free manner, for a web movement control device.

BACKGROUND OF THE INVENTION

When controlling the movement of a webs of material which are transparent to a different degree using an optical sensor, different signal deviations of the sensor are obtained as a function of the transparency of the material between the bright value (with a sensor completely uncovered) and a dark value (the sensor is completely covered by the respective web of material). Therefore, in known devices for controlling web movement, variable settings are required when changing material to set the working point of web movement control to the respective material.

Frequently a sensor is soiled during operation. As a result, signal deviation varies and control is adversely affected.

SUMMARY OF THE INVENTION

The invention is a method which can easily compensate for changes in a material to be controlled and/or soiling of a sensor.

The method steps proceed in a program-controlled fashion the required compensation can be performed quickly and simply. The current operating conditions can be automatically determined by the sensor adjustment movement controlled by the specified program and a signals received during this process. Compensation is also automatically performed by a corresponding calculation in a signal processing device. Thus, complicated re-settings associated with web movement control in the event of a change of material are eliminated.

Deviations in the originally set web movement control, which can occur as a result of soiling of the sensor and/or changing of the material of the web, can also be compensated for.

BRIEF DESCRIPTION OF THE DRAWINGS

Embodiments of the invention are subsequently explained in greater detail by way of example with reference to accompanying drawings, in which.

DETAILED DESCRIPTION OF THE PREFERRED EMBODIMENTS

Figure 1:
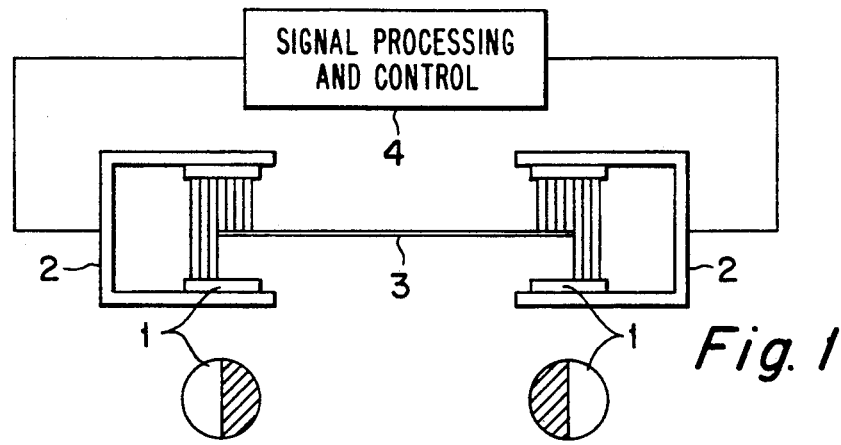
FIG. 1 shows an arrangement of sensors on both sides of a web of material.

FIG. 1 shows an arrangement of circular optical sensors 1 in a U-shaped holder 2, (not shown) the sensors 1 can be adjusted by a sensor adjustment device, on two sides of a web 3 of material edges of the web cover half of the sensors 1 in this view. An electronic signal processing and control device 4 receives the sensor signals, stores the signals and calculates correction factors. In addition, the sensor adjustment device (not illustrated) for adjusting the holders 2 of the sensors 1 is controlled by the control device 4.

Figure 2:
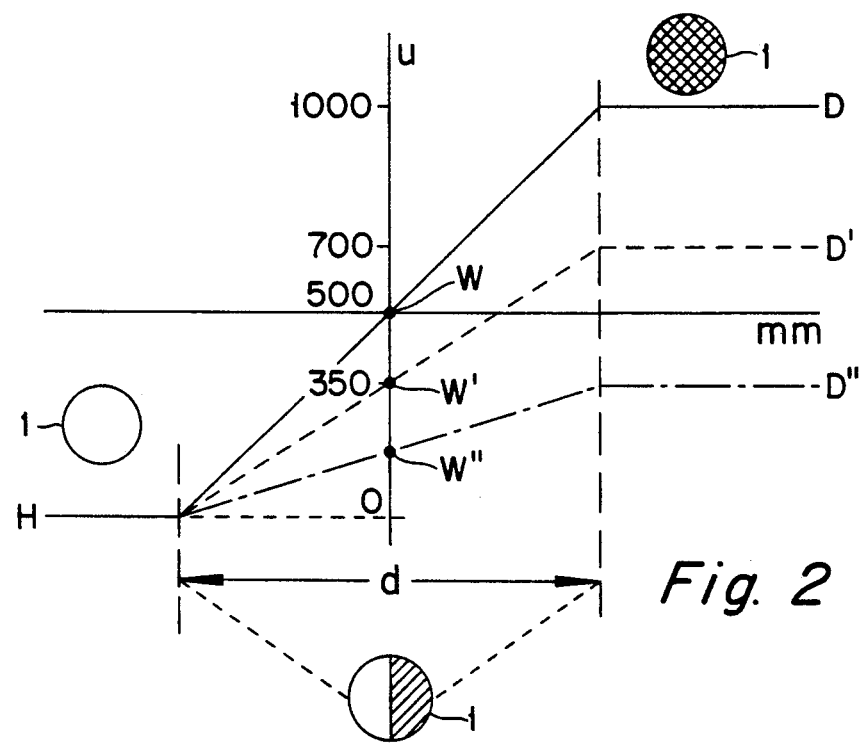
FIG. 2 shows a graph of the maximum signal contrast of an optical sensor in comparison with the signal contrast which is obtained when a transparent web of material is inserted.

FIG. 2 is a graphical representation of the variation of the signal of a sensor 1 with the diameter d between a bright value H and a dark value D. The sensor position is on the abscissa in mm and the voltage value U of the sensor signal is on the ordinate. The voltage value of the signal is obtained from the optical sensor 1 for example after an analog-to-digital conversion. On the left-hand side of FIG. 2, the sensor 1 represented is completely uncovered. In this case the maximum bright value H is obtained when the sensor is not soiled, the value being represented for example by $U=0$. On the right-hand side of FIG. 2, the sensor 1 is represented in a state in which it is completed covered by a non-translucent material. A maximum dark value D at, for example, $U=1000$ is obtained as the sensor signal in this case. The section between the bright value H and the dark value D on the abscissa corresponds to the sensor diameter d. The mean value of the bright value H and dark value D is specified at $U=500$ as the basic control value $W=0$. This value corresponds to a half-covered sensor.

Instead of the mean value $U=500$ between $U=0$ and $U=1000$, a different intermediate value can also be specified as a control value $W=0$ for control.

The maximum signal contrast or signal deviation between $H=0$ and $D=1000$, represented in FIG. 2 by unbroken lines, is determined at the first activation of web movement control or after the termination of a maintenance measure, after which optimisation of the system amplification is performed.

If the movement of a transparent web 3 of material is to be controlled, the achievable bright value H' is initially detected when the sensor is completely uncovered. This value coincides with the bright value $H=0$ of the first setting when the sensor 1 is not soiled. Then, the dark value D' is determined which is obtained when the sensor is completely covered by the transparent web 3 of material. Because of the transparency of the material, the dark value D' lies below the originally determined maximum dark value D, for example at $D'=700$. In FIG. 2, this signal characteristic is represented by a broken line.

Figure 5:
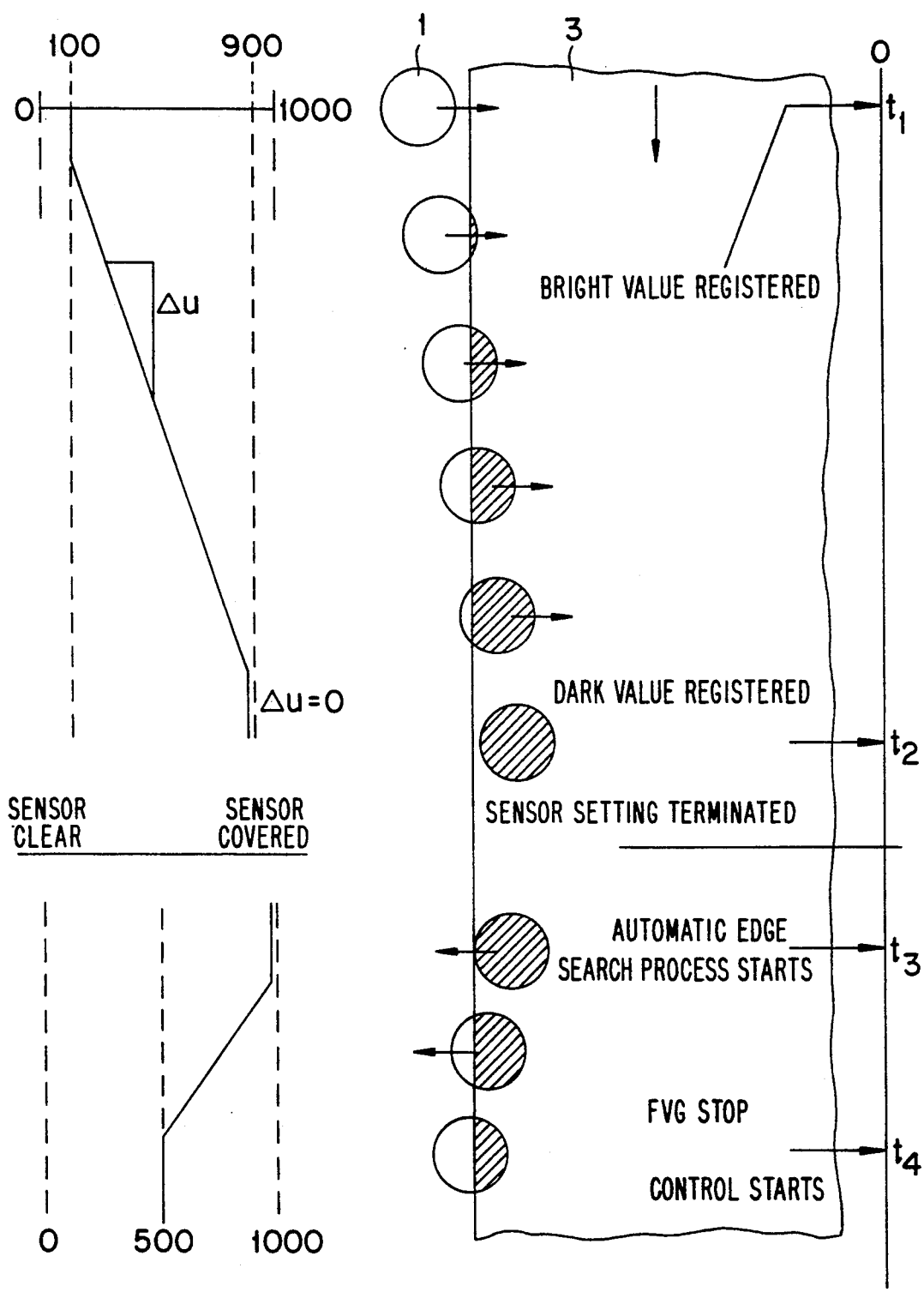
FIG. 5 shows a graph according to the invention before web movement control starts.

This determination of the bright value and the dark value, as well as the determination of the bright and dark values for the previously mentioned basic setting, is executed by means of a program step which is preset in the control device. The sensor adjustment device is initially driven such that the sensor is moved out of the completely uncovered position into the completely covered position or vice versa, according to the program as shown by FIG. 5. In this process, the change of the sensor signal is observed. The bright value or the dark value is derived because the sensor signal does not change during the movement adjustment, as is explained by reference to FIG. 5.

The formation of mean values in the signal processing device between H=0 and D'=700 produces an intermediate value W' at U=350, which does not correspond to the control value W at U=500 set in the control. The value W' is displaced or added up in the signal processing device using a program step such that the value W' is changed to the basic control value W with which web movement control can operate, as before.

If a change of material takes place, in which the movement of a different web 3 of material with a different degree of transparency is to be controlled, the described method cycle is triggered again by pressing a key. The signal contrast between the bright value and the dark value which can be for example approximately D"=350, is represented by a dot-dash line of the signal characteristic in FIG. 2. The new mean value W" is calculated and adjusted in the same way as the basic control value W. Thereafter, web movement control can proceed unchanged and without further setting steps.

Instead of adjusting the intermediate or mean values W' and W" to the basic control value W, it is also possible to raise the dark value D' which has been reduced by the transparency of the material to the level of the maximum dark value D in the signal processing device. Thus, the reduced signal deviation is spread over the maximum signal deviation so that, despite the transparent material, the original maximum signal deviation is obtained for control. This corresponds to an adjustment of the intermediate value W' to the basic control value W, where the transparency of the material is practically irrelevant for control.

The ratio between the maximum possible signal contrast determined at the basic setting and the signal contrast detected can be used as a correction factor with which all the system parameters such as amplification, switching points, etc. can be automatically corrected.

In the signal processing device, a minimum value of the dark value D' can be preset. A fault report is issued which the minimum value is detected. The report indicates that the minimum signal contrast required for web movement control has not been reached and that the respective web of material cannot be controlled.

Figure 3:
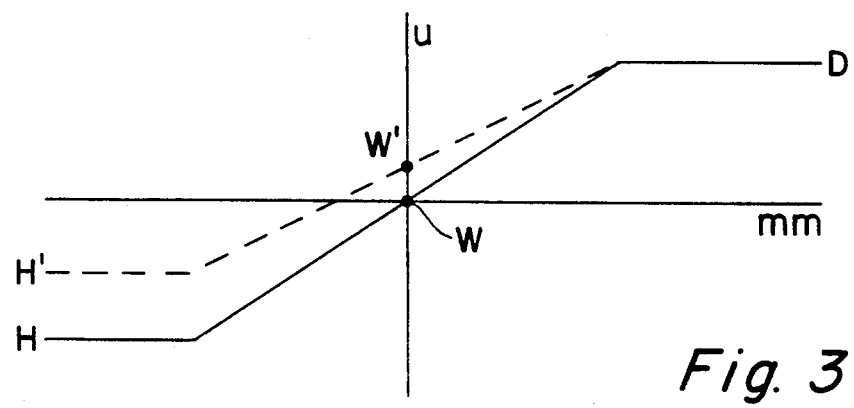
FIG. 3 shows a graph in accordance with FIG. 2, when a soiled sensor, is employed

FIG. 3 shows a signal characteristic corresponding to FIG. 2. The soiling of the sensor is represented by the bright value H', detected for example after a specific operating time. It is above the original maximum bright value H. In this case, in the same manner as described previously, the intermediate value W' can be adjusted to the basic control value W or the right value H' can be spread over the original bright value H.

Figure 4:
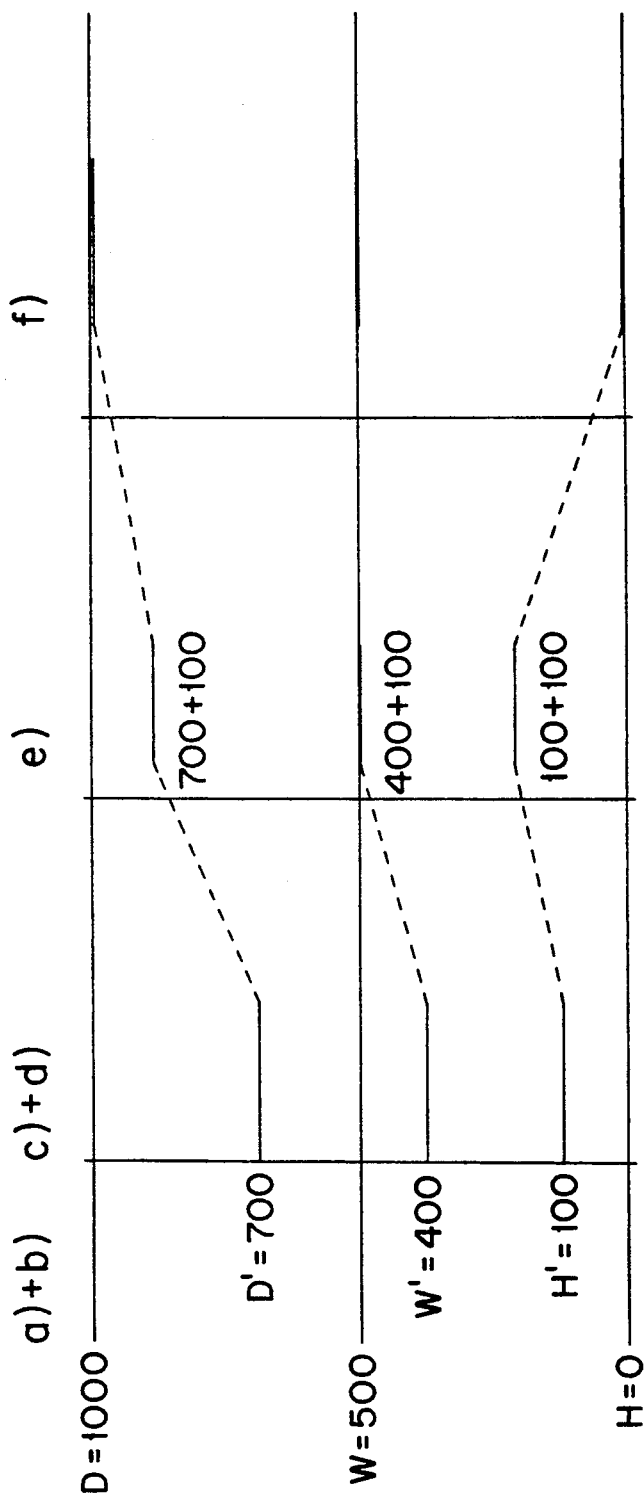
FIG. 4 shows a graph of the method according to the invention, when the of the sensor and the transparency of a web of material to be controlled are compensated for at the same time.

FIG. 4 graphically represents the method according to the invention in a different way, where the transparency of a web of material and the soiling of the sensor are compensated for at the same time. At the original system setting, the maximum achievable signal contrast between H=0 and D=1000 is determined in a step a) at the first activation and the basic control value W is specified at the mean value U=500 in a step b) and stored. If a web of material to be controlled is inserted or if different operating conditions are present, the degree of soiling of the sensor and the transparency of the web of material to be controlled are determined in a step c) by adjusting the sensors. With a sensor which has been soiled, for example after a relatively long period of operation, a maximum bright value for example H'=100 is obtained. If the soiled sensor is completely covered by the preset transparent web of material, a dark value D' of for example 700 is obtained. After this determination of the achievable signal deviation in step c), in the following step d), the value W' of the sensor is determined by (H'+D')/2=400. In a step e) the intermediate value W' which has been determined is increased to the level of the basic control value W at U=500. The signal deviation which can be achieved under the preset operating conditions is adjusted in the same way by the amount 100 (W-W') so that the following is obtained D'=800 and H'=200. In a further step f) the right value H' and the dark value D' are spread over the originally determined basic values H=0 and D=1000. These values are multiplied by the correction factor 1.66 which is obtained from the ratio between the maximum signal contrast (D−H=1000) at the basic setting and signal contrast (D'−H'=600) under preset operating conditions. By spreading the signal contrast determined under preset operating conditions over the maximum signal contrast of the basic setting, all the system parameters of the web movement control can be kept unchanged. Therefore, despite a reduced signal contrast due to a soiled sensor and a transparent material, the same accuracy can be achieved as realized with maximum signal contrast of the basic setting.

If the bright value H' determined in step c) undershoots the bright value H of the sensor determined at the basic setting for example by more than 50%, a soiling warning can be issued on a display of the device for controlling movement of the web. However, the device continues to operate with the spread signal contrast represented previously.

To compensate only for the degree of soiling of the sensor, it is possible to fix the current bright value H' of the sensor by separately instructing the control device and comparing the value with the bright value H of the basic setting. The difference H−H' can be used for the calculation process in the control device which compensates for the degree of soiling. Likewise, the ratio H/H' can be used as a correction factor, for example, to amplify the sensor signal.

FIG. 5 shows the execution of the method according to the invention with an automatic sensor set by a sensor adjustment device controlled by the electronic control device. The different settings of the sensor in relation to the web 3 of material are represented. The hatching of the sensor surface represents in each case the degree to which the sensor 1 is covered by the web 3 of material.

After the basic setting at H=0 and D=1000, later at a time $t_1$ the sensor 1 is to be moved, under given operating conditions, continuously, or in increments out of the completely uncovered position outside the web 3 of material in the direction of the edge of the web, as indicated by arrows. This is done to search for the edge of the web. The signal changes which occur are observed during the search process and the presence of the bright value or dark value are derived from the absence of a signal change. The last bright value before the edge of the web is reached is stored. When the edge of the web is reached, the sensor signal changes with a variable which is proportional to the transparency and the adjustment speed. If the signal change or voltage change $\Delta U$ is zero again, this indicates that the sensor is completely covered by the web of material. The voltage value detected at $\Delta U=0$ at the time $t_2$ thus corresponds to the dark value D' which is in turn stored. In the electronic control device 4 the previously described calculation of the intermediate value W' and its adjustment to the basic control value W and the spreading of the identified signal contrast over the original signal contrast is carried out. Thereafter, the automatic edge searching device is started at the time $t_3$ following the termination of the calculation by the sensor being moved outwardly from the completely covered position until, at the time $t_4$. At this juncture, the sensor reaches the position which corresponds to the control value $W=0$ at $U=500$, the sensor is half covered by the web of material. The sensor is stopped in this position by the sensor adjustment device (IVG) stopping, after which the web movement control starts at $t_4$.

Both the sensors to the left and to the right of the web of material are expediently set individually in the manner described because the degree of the soiling on the two sensors can be different. The degree of soiling on the two sides of the sensors can also be different when using a reflector rail opposite to where two sensors are located. Finally, the individual setting of the two sensors is also advantageous for a web of material with different degrees of transparency on the left-hand side and the right-hand side. Such a web of material, which consists for example of non-transparent material on one half and of transparent material on the other half, can be controlled to the center with sensors set individually in the manner described.

In an embodiment in which sensors run in opposite directions, the two sensors can be adjusted synchronously with respect to one another in opposite directions, for example by a common adjustment spindle with threads running in opposite directions so that one sensor cannot be moved individually. Initially, the two sensors execute an edge search process in which they are moved for example onto the web 3 of material from outside the web 3. The sensor which was first to reach an edge of the web is set in the previously descried manner with reference to the current bright value and dark value and the detected corrections factors. After this setting process at this one sensor, the automatic web edge control is switched onto the set sensor. The two sensors are then moved further inwards. Through edge control of the sensor which has already been set, during the movement adjustment of the said sensor the web can be adjusted in the direction of the second sensor which has not yet been set. Since the two sensors move in opposite directions, the web of material is fed to the second sensor. As soon as the first sensor reaches the edge of the web, the second sensor is also set in the previously described manner after the existing bright values and dark values have been detected. After the setting of the second sensor, the first sensor is positioned such that its center is aligned with the edge of the web. After the two sensors are set in this manner, the automatic center control is switched on.

When the machines on which production runs continuously are 24-hour operation, it is not possible to carry out the descried sensor setting during the continuously running web control because a separate movement of the sensor towards the edge of the web and away from the edge is required for the setting of the sensors.

To test the degree of soiling of the sensors and to carry out automatic compensation of the soiling, the control of the edge of the web is switched off or locked at preset time intervals so that, for a short time, the web of material runs in the machine in an uncontrolled manner. During this interruption of web edge control the interruption time, preset in the signal processing device, of the sensors can be moved away from the web and toward the web again so that the previously described setting processes can be executed. After the respective bright values and dark values are detected, the sensor is positioned again on the center of the edge of the web, as is represented in FIG. 4 at $t_4$, after which the interrupted control can be switched on again.

Since the sensor setting method according to the invention can be executed very quickly by an electronic control device, only a brief interruption in the web movement control is necessary to automatically compensate for soiling or to execute resetting to a different degree of transparency of the material.

With a web movement control with sensors which can be moved independently of one another, it is also possible to allow web movement control to continue with one of the two sensors while the other sensor is set in the manner described, after which web movement control is switched over to the reset sensor and the other sensor is reset, thereafter, web movement control with both sensors can continue again.

Instead of detecting the current bright value and comparing the current bright value with the original bright value for automatic soiling compensation and, if appropriate, instead of including of the current dark value for matching to a changed degree of transparency of the web of material, according to a further aspect of the invention it is also possible merely to detect the speed of change of the signal between the bright value and the dark value under given operating conditions during the adjustment movement of the sensor and to compare the aforementioned speed with the speed of change of the signal which was detected at the first activation. A factor for the compensation of the sensor soiling can be determined from the comparison of the earlier speed of change with the instantaneous detected speed of change. As can be seen from FIG. 3, with a soiled sensor a different gradient of the connecting line between the bright value and the dark value is obtained so that a correction factor for the compensation of soiling can be derived from the gradient of this curved.

With this method of compensation of soiling as a function of the speed of change of the sensor signal, it is not necessary with web center control to interrupt web movement control because the brief adjustment of the sensors only causes an apparent change in the width of the web which does not affect the control value. The sensors are also reset in this case to their previous position after the determination of the degree of soiling has ended.

With this method it is not necessary to adjust to the complete bright value or dark value because by adjusting the sensor over a partial range between the bright value and the dark value, the gradient of the signal curve or the speed of change of the signal can already be detected.

This method of automatic compensation of soiling by reference to the speed of change of the signal can also be performed on a single sensor. The method is not restricted to two sensors with center control of a web of material.

For carrying out the method according to the invention, a control field for web movement control is expediently provided. Control displays such as LEDs or LCD displays are provided for the individual control processes, such as sensor covering and sensor uncovering.

In the above description of the method according to the invention, the control value W or the working point of the web movement control is set in each case to the mean value between bright value and dark value which corresponds to the center of the diameter of the sensor. However, it is also possible to provide an offset of the control value W, for example by 10% to the left or to the right of the center of the sensor if, for example, the edge of the web is to be guided in a different way. In this case, the control value W+10% would be adjusted, as an intermediate value W' to the original control value W, for example by addition or subtraction, so that the full measuring range, which corresponds to the diameter d of the sensor, is available again.

The method according to the invention is not only suitable for optical sensors but also for other types of sensors such as pneumatic, inductive, and acoustic sensors or the like. In each case the bright value corresponds to the signal value with the sensor uncovered and the dark value corresponds to the signal value with the sensor covered. For example with a pneumatic sensor which is usually provided with a filter, the filter can be soiled in a way which corresponds to a reduction in the bright value and leads to a restriction in the signal contrast. It can be compensated for in the same manner as described above.

The method according to the invention for compensation of the control value, or the bright value and the dark value, which has been modified as a result of changed operating conditions, by an electronic signal processing device can also be executed such that the program for setting the sensors is actuated, for example by pressing a key. Subsequently a web of material is inserted into the sensor and removed again. The signal processing device detects the bright value and the dark value and calculates the control value or correction of the control value or connection of the bright value or dark value. Preferably, a sensor adjustment device is used for this function.

We claim:

1. Method for setting a sensor which detects the edge of a moving web of material in a contact-free manner, for a web movement control device, the maximum signal change, which can be achieved by the sensor, between a completely uncovered sensor condition and a completely covered sensor condition being determined in an initial state of the web movement control device and an intermediate value of this maximum signal change being specified as a basic control value for the web movement control, wherein the bright values and dark values are detected by means of an electronic signal processing device by the bright value or dark value being derived from the absence of a signal change during the movement of the web of material into the sensor or out of the sensor since the values determined in this way are stored and the intermediate value is calculated and stored, by the achievable signal change between an uncovered sensor condition and sensor being completely covered by the respective web of material being detected and stored in the same manner under given operating conditions, after which the corresponding intermediate value of the signal change identified in this way is calculated and compared with the originally detected value, and in which the last intermediate value obtained for the further web movement control being adjusted in the electronic signal processing device to the basic control value by means of a correction factor.

2. Method for setting a sensor, which detects the edge of a moving web of material in a contact-free manner, for a web movement control device, the maximum signal change, which can be achieved by the sensor, between a completely uncovered sensor condition (bright value) and a completely covered sensor condition (dark value) being determined, wherein at least one of the bright value and dark value is derived, by means of an electronic signal processing device which processes the sensor signals, from the absence of a signal change during the movement of the web of material into the sensor or out of, the sensor and is stored, in which the achievable bright value and/or dark value is detected and stored in the same manner under given operating conditions, and in which the value determined in this way is compared with the originally obtained value and given the occurrence of a difference, the last determined value is corrected, by means of a correction factor, to the value of the original bright value and/or dark value.

3. Method according to claim 1 or claim 2, in which the electronic signal processing device drives a sensor adjustment device by means of which the sensor is moved transversely with respect to the edge of the web, the bright value or dark value being derived from the absence of a signal change during the adjustment movement of the sensor and stored.

4. Method for setting a sensor which detects the edge of a moving web of material in a contact-free manner, for a web movement control device, it being possible for the sensor to be adjusted by means of a sensor adjustment device, in which the sensor adjustment device is driven by means of an electronic signal processing device to execute an adjustment movement transversely with respect to the edge of the web, the signal processing device monitoring the signals issued by the sensor during the adjustment movement and detecting therefrom the speed of the signal change between an uncovered and covered sensor state in an initial state of the web movement control device, wherein, under given operating conditions, the same process is repeated and the speed of the signal change determined in this process is compared with the originally obtained value, a correction factor for the further web movement control being derived from a difference between the original speed of signal change and one obtained under given operating conditions.

5. Method according to claim 1, 2, or 4, wherein the web movement control is briefly interrupted or blocked and the sensor setting is performed while the web movement control is switched off.

6. Method according to claim 1, 2, or 4 given coupled sensors which are moved synchronously in opposite directions, the setting of the sensor is first performed on that sensor which is the first to reach an edge of the web, after which, after this sensor is set, the web movement control is switched on with this sensor, wherein when the associated web edge is reached, the second sensor is set by determining the bright value or dark value in the same manner and the web movement control is subsequently resumed with the sensors set in this way.

7. Method according to claim 1, 2, or 4, wherein when a signal value or an achievable signal change below a preset limit value is determined, an error report is issued.

8. A method for setting a sensor which detects an edge of a moving web of material, said method comprising the steps of:

detecting an initial maximum bright value when the sensor is completely uncovered;

detecting an initial maximum dark value when the sensor is completely covered;

computing a basic control value for web movement control according to a difference between said initial maximum bright value and said initial maximum dark value;

detecting a second maximum bright value when the sensor is completely uncovered by a web of material;

detecting a second maximum dark value when the sensor is completely covered by said web of material;

computing an intermediate value for further web movement control according to a difference between said second maximum bright value and said second maximum dark value;

comparing said basic control value with said intermediate value to determine a correction factor; and adjusting said intermediate value to said basic control value according to said correction factor.

9. The method according to claim 8 wherein said steps of detecting said second maximum bright value and said second maximum dark value further include the steps of:

moving the sensor transversely with respect to an edge of said web of material; and detecting a respective maximum value when a sensed value does not change between consecutive measurements of the sensed value by the sensor.

10. A method for setting a sensor which detects an edge of a moving web of material, said method comprising the steps of:

detecting an initial maximum bright value when the sensor is completely uncovered;

detecting an initial maximum dark value when the sensor is completely covered;

computing a basic control value for web movement control according to a difference between said initial maximum bright value and said initial maximum dark value;

detecting a second maximum bright value when the sensor is completely uncovered by a web of material;

detecting a second maximum dark value when the sensor is completely covered by said web of material;

comparing said initial maximum dark value with said second maximum dark value, to determine a correction factor; and adjusting said second maximum dark value to said initial maximum dark value according to said correction factor.

11. The method according to claim 10 wherein said steps of detecting said second maximum bright value and said second maximum dark value further include the steps of:

moving the sensor transversely with respect to an edge of said web of material; and detecting a respective maximum value when a sensed value does not change between consecutive measurements of the sensed value by the sensor.

12. The method of claim 10 further including the steps of:

comparing said second maximum dark value with a preset minimum dark value; and generating an error signal when said second maximum dark value is less than said preset minimum dark value.

13. A method for setting a sensor which detects an edge of a moving web of material, said method comprising the steps of:

detecting an initial maximum bright value when the sensor is completely uncovered;

detecting an initial maximum dark value when the sensor is completely covered;

computing an initial speed for an initial state of web movement control according to a time difference between when said initial maximum bright value is detected and when said initial maximum dark value is detected;

moving the sensor transversely with respect to an edge of a web of material;

detecting a second maximum bright value when the sensor is completely uncovered by said web of material;

detecting a second maximum dark value when the sensor is completely covered by said web of material;

computing a second speed for further web movement control according to a time difference between when said second maximum bright value is detected and said second maximum dark value is detected; and comparing said initial speed with said second speed to determine a correction factor for further web movement control.

14. A method of setting a sensor arranged to detect an edge of a moving web of material, said sensor being characterized by a nominal control value which is a value intermediate a first nominal value which is an expected value when sensor is completely uncovered by said web and a second nominal value which is an expected value when the sensor is completely covered by said web, said method comprising the steps of:

determining a first actual value when the sensor is completely uncovered by said web;

determining a second actual value when the sensor is completely covered by said web;

determining an actual control value on the basis of said first actual value and said second actual value; and adjusting said actual control value to said nominal control value by means of a correction factor.

15. A method as claimed in claim 14 wherein said basic control value is an arithmetic mean of said first nominal value and said second nominal value, and wherein said actual central control value is an arithmetic mean of said first actual value and said second actual value.

* * * * *